United States Patent [19]
Hirao et al.

[11] 3,830,096
[45] Aug. 20, 1974

[54] A LOAD INSENSITIVE TYPE FLUID RESTRICTOR

[75] Inventors: Toshiro Hirao, Yokohama; Eiichi Ando, Tokyo, both of Japan

[73] Assignee: Meidensha Electric Mfg., Co., Ltd., Tokyo, Japan

[22] Filed: July 18, 1972

[21] Appl. No.: 272,869

[52] U.S. Cl. ............................ 73/37.5, 137/842
[51] Int. Cl. .................... F15c 1/16, G01b 13/12
[58] Field of Search ...................... 137/803–842; 235/201 ME; 73/37.5

[56] References Cited
UNITED STATES PATENTS

| 3,267,947 | 8/1966 | Boules | 137/840 X |
| 3,270,758 | 9/1966 | Bauer | 137/840 |
| 3,401,710 | 9/1968 | Keto | 137/842 |
| 3,461,895 | 8/1969 | Colston | 137/842 X |
| 3,561,465 | 2/1971 | De Graaf | 137/842 |
| 3,565,091 | 2/1971 | Auger | 137/842 X |
| 3,576,131 | 4/1971 | Calderazzo | 137/842 X |
| 3,601,138 | 8/1971 | Glattli et al. | 137/803 |
| 3,620,087 | 11/1971 | Davis et al. | 137/842 X |
| 3,636,964 | 1/1972 | Colamussi et al. | 137/842 X |
| 3,656,495 | 4/1972 | Noren | 137/842 X |
| 3,698,413 | 10/1972 | Sulich | 137/842 |

*Primary Examiner*—William R. Cline
*Attorney, Agent, or Firm*—Lane, Aitken, Dunner & Ziems

[57] ABSTRACT

A load insensitive type fluid restrictor for providing a substantially constant output under varying load diameters. The restrictor includes a body having a fluid inlet passage of small diameter, a fluid outlet passage in communication therewith and having a relatively large diameter and one or more fluid discharge—suction passages of the same diameter as the fluid outlet passage. The fluid discharge—suction passages are disposed at a right angle to the axis of the fluid inlet and outlet passages and communicate the junction of the inlet and outlet passages with the atmosphere.

2 Claims, 7 Drawing Figures

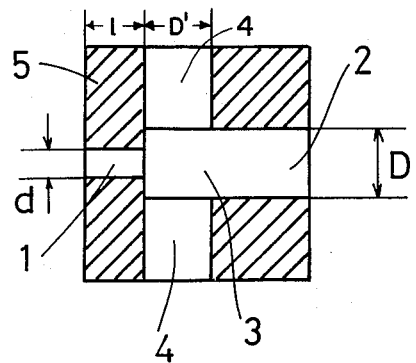
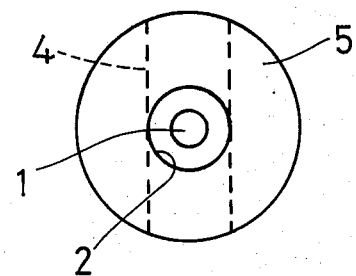
Fig. 1(A)      Fig. 1(B)
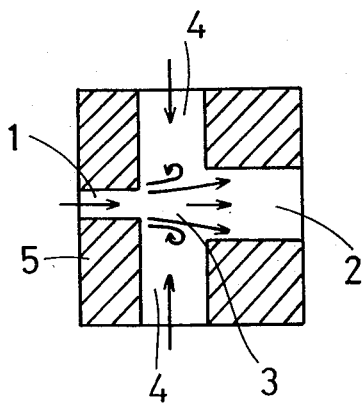
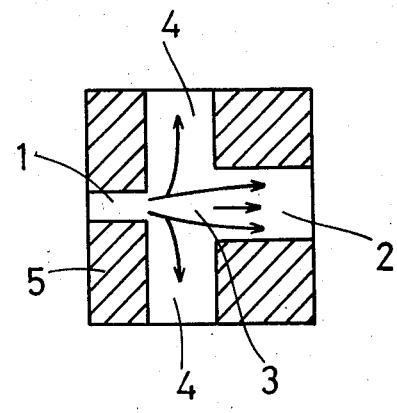
Fig. 2      Fig. 3
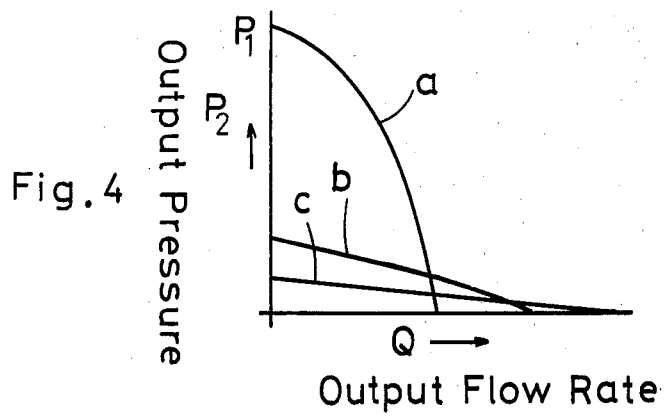
Fig. 4
Output Pressure
Output Flow Rate

A LOAD INSENSITIVE TYPE FLUID RESTRICTOR

BACKGROUND OF THE INVENTION

This invention relates to a load insensitive type fluid restrictor for use in a fluid circuit.

In fluid circuits of the type in which one or more fluid elements constituting a load demand are operated by air or other compressible fluids fed under pressure from a supply source, such as a compressor, a fluid restrictor is commonly used between the supply and the load for reducing the pressure of the fluid. However, most conventional restrictors, which are usually of an orifice type, suffer from the disadvantage of being incapable of accommodating variations in the load. For example, the output pressure of the restrictor of the pressure being applied to the load will vary in a wide range as a result of a change in the number of fluid elements supplied by the output of the restrictor. Further, the input pressure of such fluid elements most often must be maintained within a relatively narrow range, thus requiring the expansion number (or factor) of the restrictor to be of relatively constant value if the quantity of fluid flow through the restrictor is to be adequate to supply the load demand of the fluid elements. With conventional restrictors, variations in output pressure as a result of varying loads have led to a failure to maintain the desired constant expansion number, such that multiple restrictors with diverse orifice sizes have been required to achieve satisfactory results.

Accordingly, it is a principal object of the present invention to provide a restrictor for use in fluid circuits of the type referred to and which is both insensitive to varying load and capable of providing a substantially constant output pressure.

SUMMARY OF THE INVENTION

According to the present invention, a load insensitive type fluid restrictor contains in its body fluid input and output passages having different diameters and connected to each other and to one or more fluid discharge-suction passages arranged at a right angle to the junction of said input and output passages and in communication with the atmosphere. By this design, it is possible to provide a substantially constant output pressure for varying loads.

BRIEF DESCRIPTION OF THE DRAWINGS

FIG. 1(A) is a longitudinal cross-sectional view of the restrictor of the present invention;

FIG. 1(B) is an end elevation of the restrictor as seen from the right side thereof in FIG. 1(A);

FIGS. 2 and 3 are functional illustrations of the restrictor of the present invention under different operating conditions;

FIG. 4 is a diagram with curves depicting a comparison of the characteristics of the restrictor of the invention with those of a conventional type of restrictor;

DETAILED DESCRIPTION OF THE PREFERRED EMBODIMENT

Figure 5:
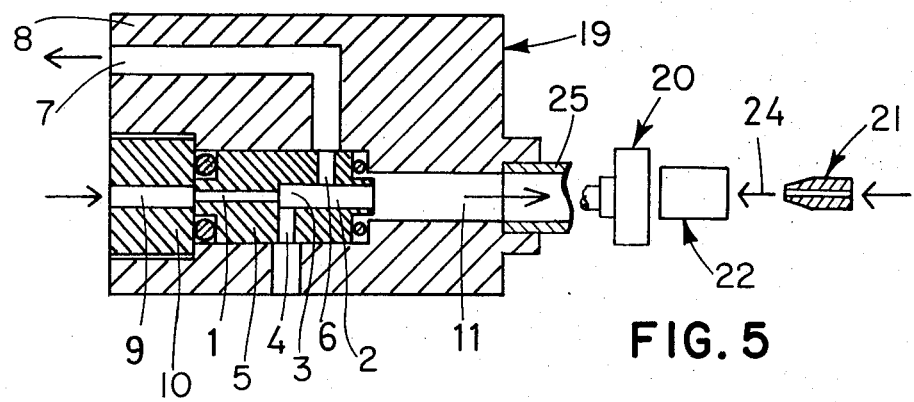
FIG. 5 is a cross-sectional view of an embodiment of the fluid restrictor of the invention used with a fluid sensor.

As shown in FIGS. 1-3 of the drawing, an embodiment of the restrictor of the invention is formed with a body 5 provided with a fluid inlet passage 1 having a small diameter $d$, a fluid outlet passage 2 having a relatively large diameter D and in communication with the inlet passage 1 and two fluid discharge-suction passages 4 having the same diameter as that of the outlet passage 2. The passages 4 are disposed adjacent to the junction 3 of said fluid input and output passages and extend at a right angle to a plane parallel to the longitudinal axis of the outlet passage 2, as shown. The inlet passage and the outlet passage define a radial interface thereby to establish a stepped junction 3 between the inlet and the outlet passage and the discharge suction passages 4 intersect the outlet passage 2 at the stepped junction 3. Also, it will be noted that the passages extend between the junction 3 and the atmosphere outside the body 5.

In operation, when a compressible fluid, such as air, for example, is introduced through the inlet passage 1 under conditions in which a relatively large load demand (not shown) is connected to output passage 2, as shown in FIG. 2, vortices will develop at the junction 3 due to the velocity of air being introduced, thus providing a low pressure region. This results in the suction of the air through the discharge-suction passage 4 into the junction 3 due to the pressure difference created between the junction 3 and the ambient air; e.g., the air at atmospheric pressure. Conversely, in the case of a small load demand, the static pressure in the outlet passage 2, as shown in FIG. 3, will be increased, thereby extinguishing the vortex with the result that the air inside the junction 3 is exhausted through the discharge-suction passage 4 to the atmosphere.

In this manner, depending on the magnitude of the load demand, the air will be exhausted to the atmosphere or sucked therefrom through the fluid discharge-suction passage, such that the pressure at the output side of the outlet passage 2, (i.e., the output pressure) may be maintained at a substantially constant value irrespective of variations in the load demand placed on the restrictor by the fluid elements supplied.

The operating characteristics of the restrictor of the present invention compared with those of the prior art are depicted in FIG. 4 in which inlet pressure $P_1$ is assumed to be constant and curves $a$, $b$ and $c$ represent values of outlet pressures $P_2$ plotted against values of flow rates Q in the outlet passage 2. With the conventional orifice type restrictor having a diameter $d$, the output pressure $P_2$ varies over a wide range with corresponding variation in the output flow rate Q as may be caused, for example, by varying load demands. This characteristic is represented by curve $a$ in FIG. 4. The restrictor of the present invention provides considerable improvement over the conventional type restrictor with regards to the variance of the output pressure $P_2$ with respect to the varying output flow rate Q as shown by curve $b$ in FIG. 4. To achieve the performance curve $b$, the restrictor of the invention was formed so that the ratio of the diameter $d$ of the inlet passage 1 to that D of the outlet passage 2 is 1:2 and the diameter D of the output passage 2 equal to the diameter D' of the fluid discharge-suction passage 4. Where the ratio of $d$:D =

1:5 and D = D', the results constitute an even greater improvement as depicted by the curve c of FIG. 4.

As can be seen from the performance curves of FIG. 4, the restrictor of the present invention provides a substantially constant output pressure regardless of the varying output flow rates. In particular, it provides an output pressure which has been effectively lowered, whereas the restrictor of the conventional type provides the relation of $P_2 = P_1$ when the load demand on the restrictor is zero, i.e., when the output passage is blocked, wherein $P_1$ = input pressure and $P_2$ = output pressure.

Also it will be noted that where the outlet diameter D is greater relative to the inlet diameter d, the total output pressure of the restrictor will be reduced. In such case, the variation in the output pressure due to the varying output flow rates will be smaller. On the other hand, the value D' should be such that it does not function as a resistance for the flow and should be of a value equal to 2d or greater.

In FIG. 5, the restrictor of the kind shown in FIG. 1 is embodied in a fluid sensor. A switch or signal generating means is designated by the reference numeral 19, the exit of which is connected by piping 25 with a sensor head 20. Alternatively, the sensor head 20 may be directly connected with the switch 19. A nozzle 21 is adapted to issue a fluid jet so as to hit the sensor head 20 so that when a substance 22 comes between the sensor head 20 and the nozzle 21, the sensor head responds to the absence of the pressure by developing a detecting signal.

The switch 19 shown in FIG. 5 includes the restrictor body 5 in a switch body 8 which incorporates an input section 10 having a supply port 9 communicating with the inlet port 1 of the fluid restrictor body 5. In this instance, the fluid restrictore body 5 has only one fluid discharge-suction passage 4 and a signal flow passage 6 which is in communication with the outlet passage 2 downstream from the passage 4. Accordingly, signal flow will be fed to a control (not shown) through the signal flow passage 6 and a passage 7 provided in the switch body 8.

Assuming that the air is fed through the supply passage 9, the air is partly restricted with respect to the flow rate and then fed through outlet passage 2 into the exhaust passage 11 which, as described above, is connected with the sensor head 20. It should be noted that the fluid discharge-suction passage 4 functions to discharge or suck the air depending on the magnitude of the load resistance. In other words, when the load resistance is small, there will be created a low pressure region at 3 and air will be sucked through the fluid discharge or suction passage 4. Conversely, in the case of the great load resistance, air will be discharged so that the output pressure in the signal flow passage 6 and hence the passage 7 will be maintained below the pressure of the air existent in the supply passage 9. The pressure in the signal flow passage 6 and hence in the passage 7 is maintained negative due to the low pressure region being produced, when the small load resistance is provided by an element connected with the exhaust passage 11; (i.e., the sensor head 20) particularly when the fluid flows from the supply passage 9 to the exhaust passage 11. If the flow to the exhaust passage 11 is interrupted to thereby create an increased load resistance, the low pressure region at 3 will be extinguished with a resultant rise in the output pressure in the signal flow passage 6 and hence the passage 7.

Figure 6:
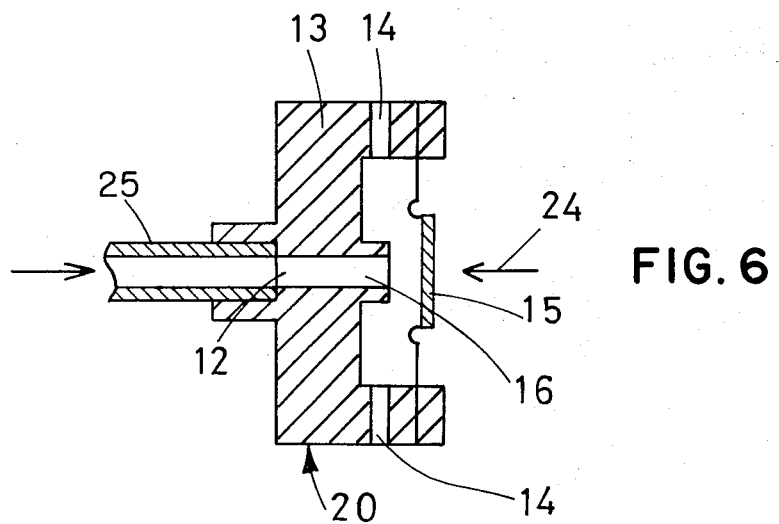
FIG. 6 is a cross-sectional view of a sensor head component of the embodiment shown generally in FIG. 5.

For better understanding of the sensor head structure, reference is made to FIG. 6 for an example of such structure. As shown, the jet stream 24 normally strikes the diaphragm 15 of the sensor head, such that the diaphragm will be displaced by the jet stream to block the nozzle 16. Accordingly, the pressure in the signal flow passage 6 and the passage 7 will be increased, because the output passage 2 is in communication with the nozzle 16.

When the substance 22 is interposed between the sensor head 20 and the nozzle 21 and thus the jet stream is interrupted by the substance 22, then the fluid flow from the supply passage 9 will be discharged through the exhaust passage 11, the nozzle 16 and vents 14 in the sensor between the diaphragm 15 and the nozzle 16, so that the pressure in the signal flow passage 6 and passage 7 will be reduced to less than or close to atmospheric pressure.

Furthermore, while the diaphragm 15 is used to block the sensor head 20, the jet stream 24 may be liquid in lieu of air. The use of the liquid jet stream enables the positioning of the detecting means or sensor long distances from the jet nozzle 21, thereby permitting the detection of any minute substance. Another advantage of the diaphragm 15 is that the area of the diaphragm 15, which receives the jet stream, permits the easy adjustment of the orientation of the jet stream, because of the size of area relative to the cross-section of the jet stream.

It is to be noted that in the absence of the substance 22 to be detected thus raising the pressure in the signal flow passage 6 and the passage 7 as above mentioned, the increasing pressure will be relieved through the bleed passage 4, thus maintaining the pressure below the supply presure, with the consequent avoidance of the possibility of excessive increase in the control signal pressure.

With this arrangement, the distance between the sensor head 20 and the switch 19 may be long with moderate increase in the output pressure in the case of the blockage of the nozzle 16. This feature is particularly suited for the use of a simple fluid element. The provision of the switch 19 further permits the nozzle 16 to pass a greater flow rate than the supply flow, thus presenting improved sensibility for the sensor. This means that the flow rate of the jet stream 24 may be reduced or that the detecting distance may be further extended in the case of the flow rate of the jet stream being constant.

Another advantage of the example shown herein is that the piping to the sensor head need not be increased in number i.e., a single pipe may suffice. Also it is contemplated that the type of the sensor head is not necessarily limited to the type of the sensor as shown in FIG. 6. In other words, it is possible to design such a sensor head which, as opposed to the example described, may provide the pressure increase when it senses the substance interrupting the jet stream.

As is apparent from the foregoing, the restrictor of the present invention can provide sufficiently small variation in the output pressure regardless of whether the expansion number is changed, the number of the fluid discharge or suction passages is changed as the resistance value of a variable restrictor employed as a fluid element in the circuit supplied by the restrictor of the invention is changed.

It will be apparent that the embodiments shown are only exemplary and that various modifications can be made in construction and arrangement within the scope of the invention as defined in the appended claims.

We claim:

1. A restrictor for use in compressible fluid circuits to reduce pressures of fluid fed to variable demand load without substantial changes in fluid pressure on a load side of the restrictor, said restrictor comprising:
   a body having a fluid inlet passage of cylindrical shape formed therein;
   said body also having formed therein a cylindrically shaped fluid outlet passage of a diameter greater than the diameter of said inlet passage, said outlet passage being coaxially aligned with said inlet passage, and defining with said inlet passage a radial interface, thereby to establish a stepped junction between said inlet and said outlet passage, the diameter ratio of said outlet passage to said inlet passage being from 2 to 5; and
   said body further having at least one fluid discharge-suction passage of cylindrical shape formed therein and extending at a right angle with respect to a plane parallel to the longitudinal axis of said outlet passage and intersecting said outlet passage at said stepped junction, said discharge-suction passage having a diameter equal to the diameter of said outlet passage and communicating between said stepped junction and the atmosphere.

2. The apparatus recited in claim 1 comprising further, a sensor head connected to and adapted to block or release signal pressure from said fluid outlet passage; and means to enable detection of the blocked or released condition of the signal pressure.

* * * * *

UNITED STATES PATENT OFFICE
CERTIFICATE OF CORRECTION

Patent No. 3,830,096               Dated August 20, 1974

Inventor(s) Toshiro Hirao et al

It is certified that error appears in the above-identified patent and that said Letters Patent are hereby corrected as shown below:

At column 2, line 8, after "with" insert --and coaxially aligned with--.

At column 3, line 37, "restrictore" should be --restrictor--.

Signed and sealed this 26th day of November 1974.

(SEAL)
Attest:

McCOY M. GIBSON JR.          C. MARSHALL DANN
Attesting Officer            Commissioner of Patents